United States Patent
Lee et al.

(10) Patent No.: US 8,284,155 B2
(45) Date of Patent: Oct. 9, 2012

(54) DISPLAY DEVICE

(75) Inventors: Hyun-su Lee, Cheonan-si (KR); Jin-ho Park, Suwon-si (KR); Byoung-jun Lee, Cheonan-si (KR)

(73) Assignee: Samsung Electronics Co., Ltd. (KR)

( * ) Notice: Subject to any disclaimer, the term of this patent is extended or adjusted under 35 U.S.C. 154(b) by 1195 days.

(21) Appl. No.: 11/940,070

(22) Filed: Nov. 14, 2007

(65) Prior Publication Data

US 2008/0158199 A1 Jul. 3, 2008

(30) Foreign Application Priority Data

Dec. 27, 2006 (KR) .................. 10-2006-0135214

(51) Int. Cl.
*G09G 3/36* (2006.01)
*G09G 5/00* (2006.01)
(52) U.S. Cl. ........... 345/104; 345/87; 345/156; 345/173
(58) Field of Classification Search .................. 345/87, 345/88, 104, 156, 173
See application file for complete search history.

(56) References Cited

U.S. PATENT DOCUMENTS

| 6,501,529 | B1 | 12/2002 | Kurihara et al. | |
|---|---|---|---|---|
| 2004/0169625 | A1 | 9/2004 | Park et al. | |
| 2006/0109222 | A1 | 5/2006 | Lee et al. | |
| 2008/0239214 | A1* | 10/2008 | Lee et al. | 349/106 |
| 2009/0167703 | A1* | 7/2009 | You et al. | 345/173 |
| 2009/0174681 | A1* | 7/2009 | Chang et al. | 345/173 |

FOREIGN PATENT DOCUMENTS

| JP | 09-080467 | 3/1997 |
|---|---|---|
| JP | 2001-042296 A | 2/2001 |
| JP | 2006-119446 | 5/2006 |
| JP | 2006-040269 A | 2/2008 |

* cited by examiner

Primary Examiner — My-Chau T Tran
(74) Attorney, Agent, or Firm — Innovation Counsel LLP

(57) ABSTRACT

A display device includes: a first insulating substrate; a main pixel which is formed on the first insulating substrate and comprises a plurality of sub-pixels and a single sensing electrode; a second insulating substrate which faces the first insulating substrate; a sensing spacer formed on the second insulating substrate which faces the sensing electrode; and a contact electrode formed on the sensing spacer.

12 Claims, 5 Drawing Sheets

DISPLAY DEVICE

CROSS-REFERENCE TO RELATED APPLICATIONS

This application claims priority from Korean Patent Application No. 2006-0135214, filed on Dec. 27, 2006 in the Korean Intellectual Property Office, the disclosure of which is incorporated herein by reference.

BACKGROUND OF INVENTION

1. Field of Invention

Apparatuses and methods consistent with the present invention relate to a display device, more particularly, to a display device which has an inner type touch panel.

2. Description of the Related Art

A touch panel, generally provided at the uppermost surface of a display, accepts user input by means of the touch of a finger tip or object to select contents displayed on the screen of the display device. A display device, such as a liquid crystal display, having a touch panel does not need input components such as a keyboard, a mouse, etc.

Some displays use an internal pressure-sensor to sense an external contact. A spacer and two or three sensing electrodes are formed inside the display adjacent to a specific pixel to transmit position information. Accordingly, the pixel where the sensing electrodes are formed has a decreased aperture ratio and the rendition of red, green, and blue colors may become unbalanced. Further, pressure may be detected by the sensing electrodes at two or more points and thus the position information may not be properly transmitted if sensing electrodes have different heights.

SUMMARY OF THE INVENTION

Accordingly, it is an aspect of the present invention to provide a pressure-sensing display device having an improved aperture ratio and visibility.

Another aspect of the present invention is to provide a display device which obtains position information easily and accurately.

The foregoing and/or other aspects of the present invention can be achieved by providing a display device comprising: a first insulating substrate; a main pixel which is formed on the first insulating substrate and which has a plurality of sub-pixels and a single sensing electrode; a second insulating substrate which faces the first insulating substrate; a sensing spacer formed on the second insulating substrate which faces the sensing electrode; and a contact electrode formed on the sensing spacer.

According to an aspect of the invention, each sub-pixel comprises: a gate line; a data line which intersects the gate line; a thin film transistor formed at an intersection area of the gate line and the data line; and a pixel electrode electrically connected to the thin film transistor, wherein the main pixel comprises a red sub-pixel, a green sub-pixel and a blue sub-pixel.

According to an aspect of the invention, the display device further comprises: a first sensing line formed parallel with the gate line; a second sensing line formed parallel with the data line; and an extending part which extends from the second sensing line and overlaps with the sensing electrode.

According to an aspect of the invention, the main pixel comprises: a first main pixel which comprises a Y-sensing electrode connected to the first sensing line; and a second main pixel which comprises an X-sensing electrode connected to the second sensing line, wherein the first main pixel and the second main pixel are disposed alternately.

According to an aspect of the invention, the pixel electrode in each sub-pixel has substantially the same area.

According to an aspect of the invention, a pixel electrode of one sub-pixel is smaller in area than those of the other sub-pixels because of the sensing electrode.

According to an aspect of the invention, a pixel electrode of the blue sub-pixel is smaller in area than those of the other sub-pixels because of the sensing electrode.

According to an aspect of the invention, the sensing electrode is formed in the same layer as the pixel electrode.

According to an aspect of the invention, the display device further comprises a common electrode formed on the second insulating substrate, wherein the common electrode and the contact electrode are supplied with a predetermined level of common voltage.

According to an aspect of the invention, the contact electrode is formed in the same layer as the common electrode.

According to an aspect of the invention, the contact electrode is formed in a different layer from the common electrode.

According to an aspect of the invention, the display device further comprises a cell gap spacer formed on the second insulating substrate.

The foregoing and/or other aspects of the present invention can be achieved by providing a display device comprising: a first insulating substrate; a gate line and a data line which are formed on the first insulating substrate and intersect each other; a Y-sensing line formed parallel with the gate line; an X-sensing line formed parallel with the data line; a first pixel which is connected to the Y-sensing line and comprises a Y-sensing electrode which generates a Y position signal reacting to an external stimulus; a second pixel which is connected to the X-sensing line and comprises an X-sensing electrode which generates an X position signal reacting to the external stimulus; and a sensing driver which receives the Y position signal from the first pixel and the X position signal from the second pixel among position information reacting to the external stimulus.

According to an aspect of the invention, the first pixel and the second pixel are disposed alternately.

According to an aspect of the invention, the first pixel and the second pixel comprise: at least one thin film transistor formed at an intersection area of the gate line and the data line; and a pixel electrode connected to the thin film transistor.

According to an aspect of the invention, the first pixel and the second pixel comprise a red sub-pixel, a blue sub-pixel and a green sub-pixel, and the pixel electrode in each sub-pixel has substantially the same area.

According to an aspect of the invention, the first pixel and the second pixel comprise a red sub-pixel, a blue sub-pixel and a green sub-pixel, and a pixel electrode of the blue sub-pixel is smaller in area than those of the other sub-pixels because of the Y-sensing electrode or the X-sensing electrode.

According to an aspect of the invention, the display device further comprises: a second insulating substrate which faces the first insulating substrate; a sensing spacer formed on the second insulating substrate which faces the Y-sensing electrode and the X-sensing electrode; a contact electrode formed on the sensing spacer; and a common electrode formed on the second insulating substrate.

According to an aspect of the invention, the common electrode and the contact electrode are applied with a common voltage of a predetermined level.

According to an aspect of the invention, the contact electrode faces the X-sensing electrode and the Y-sensing electrode.

According to an aspect of the invention, areas of the Y-sensing electrode and the X-sensing electrode are the same as or lager than an area of the contact electrode.

According to an aspect of the invention, the contact electrode is formed in the same layer as the common electrode.

According to an aspect of the invention, the contact electrode is formed in a different layer from the common electrode.

According to an aspect of the invention, the display device further comprises a cell gap spacer formed on the second insulating substrate.

BRIEF DESCRIPTION OF THE DRAWINGS

The above and/or other aspects of the present invention will become apparent and more readily appreciated from the following description of the exemplary embodiments, taken in conjunction with the accompanying drawings, in which.

DETAILED DESCRIPTION

Figure 1:
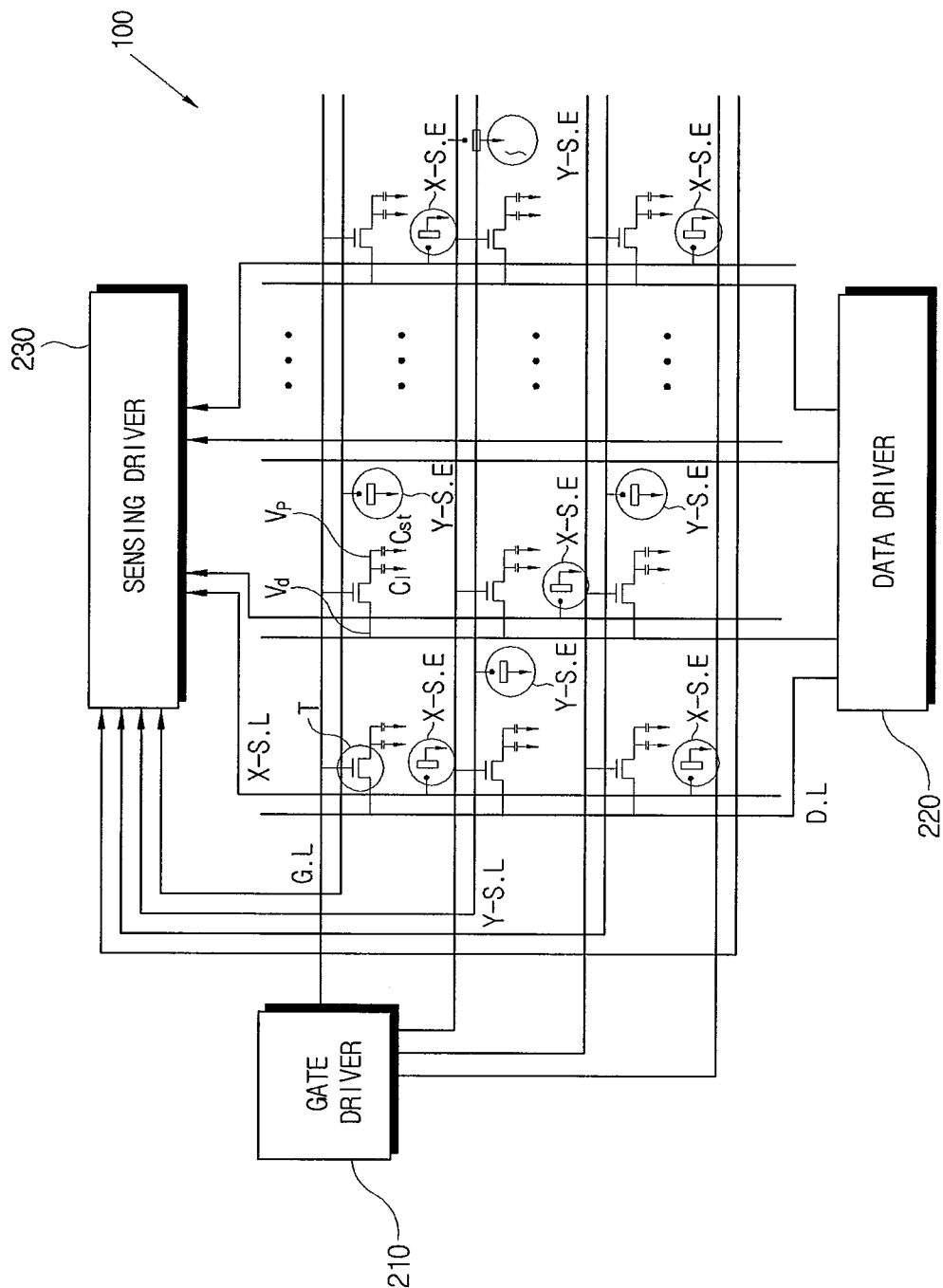
FIG. 1 is a control block diagram of a display device according to a first exemplary embodiment of the present invention.

Reference will now be made in detail to the embodiments of the present invention, examples of which are illustrated in the accompanying drawings, wherein like reference numerals refer to like elements throughout. The exemplary embodiments are described below so as to explain the present invention by referring to the figures.

Referring to FIG. 1, a display device according to a first exemplary embodiment of the present invention has a touch-screen function which displays images formed according to an external pressure. The display device includes a sensing electrode S.E to sense pressure disposed in a display panel 100 in an inner type.

The display device according to the present exemplary embodiment includes the display panel 100, a gate driver 210, a data driver 220 and a sensing driver 230 to process a sensing signal. The display panel 100 is provided as a liquid crystal display panel (see FIG. 3) which includes a liquid crystal layer.

Figure 2:
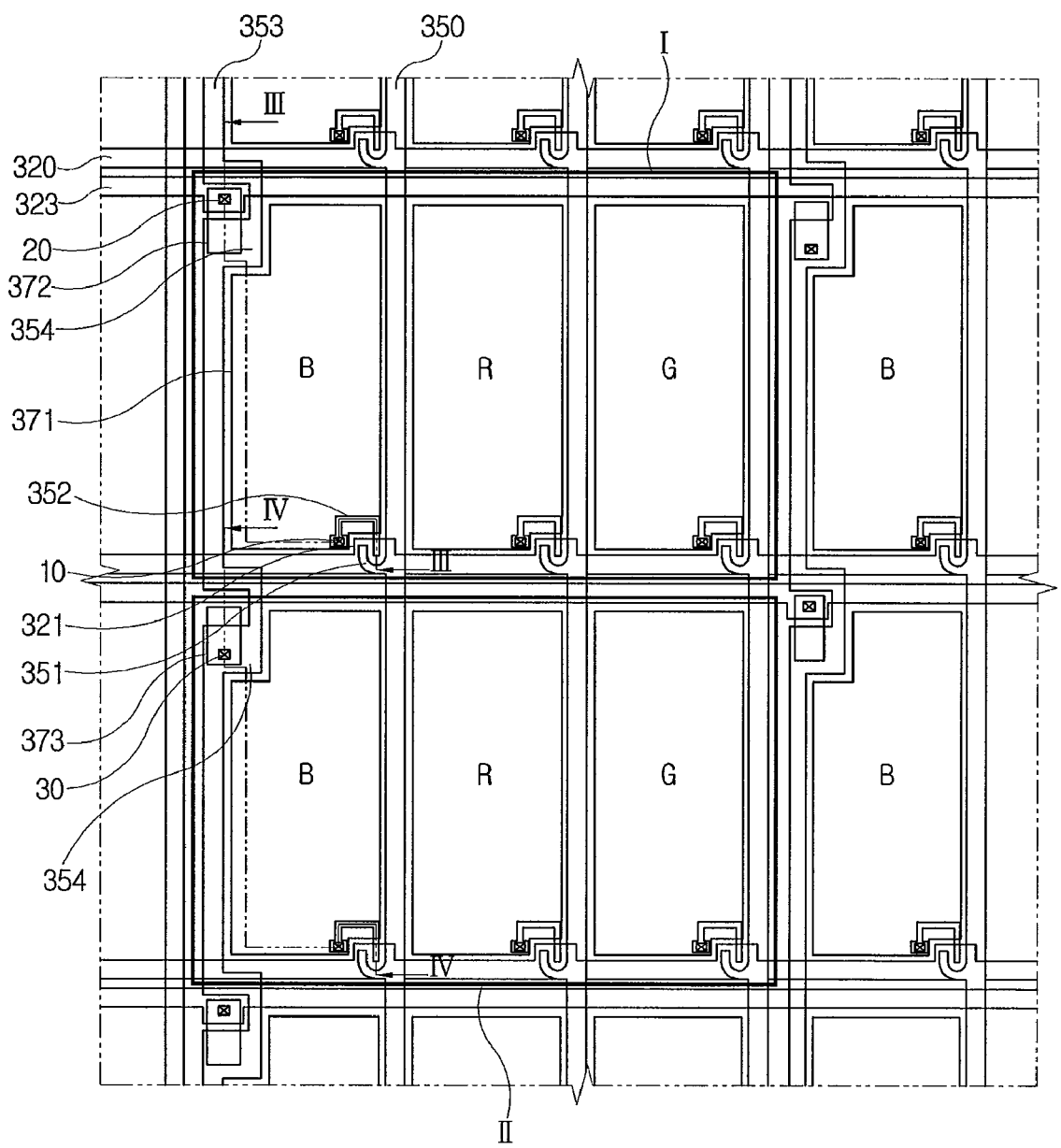
FIG. 2 is a plan view of the display device according to the first exemplary embodiment of the present invention.

The display panel 100 includes a plurality of main pixels, and each main pixel includes a red sub-pixel, a blue sub-pixel and a green sub-pixel (see FIG. 2). A main pixel includes a sensing electrode S.E, and each sub-pixel includes at least one thin film transistor (TFT) T. The display panel 100 includes a gate line G.L which extends in a predetermined direction and a data line D.L which intersects the gate line G.L in order to apply signals to the TFT. Further, the display panel 100 includes a Y sensing line Y-S.L which extends parallel with the gate line G.L and an X sensing line X-S.L which extends parallel with the data line D.L in order to transmit predetermined electric signals from the sensing electrode S.E.

The main pixel includes a liquid crystal capacity Cl between the TFT T and a common voltage (Vcom) and a storage capacity Cst connected to the TFT T. When a gate on signal is applied to the gate line G.L to turn on the TFT T, a data voltage Vd supplied to the data line D.L is applied to a pixel electrode (not shown) through the TFT T.

The electric field difference between the pixel voltage Vp applied to the pixel electrode and the common voltage Vcom is generated in liquid crystals (illustrated as a liquid crystal capacitance Cl in FIG. 1). Light is transmitted through the liquid crystal corresponding to the intensity of the electric field which varies the transmittance of the liquid crystal. The pixel voltage Vp should be maintained for one frame, and the auxiliary storage capacitor Cst is used to maintain the pixel voltage Vp applied to the pixel electrode.

The sensing electrode S.E in the main pixel transmits an electric signal that reacts to an external stimulus such as pressure to the sensing line S.L. The sensing electrode S.E includes a Y-sensing electrode Y-S.E which is connected to the Y-sensing line Y-S.L to transmit Y position information and an X-sensing electrode X-S.E which is connected to the X sensing line X-S.L to transmit X position information. In the display device according to the present embodiment, a main pixel includes one sensing electrode S.E, which is a one-point contact type.

In a conventional display device, the use of two or more sensing electrodes to sense position information in a main pixel, especially in one sub-pixel, cause the sub-pixels to be asymmetric, thereby reducing visibility. Further, when two or more sensing electrodes are provided, and all must be stimulated simultaneously generate position information. If one of the sensing electrodes is not stimulated, position information is not transmitted. Further, if the sensing electrodes have different heights, stimulus may not properly be given to the sensing electrodes.

In the present exemplary embodiment, the Y-sensing electrode Y-S.E to sense Y position information and the X-sensing electrode X-S.E to sense X position information are not formed in the same main pixel but are formed in different main pixels. If the main pixels provided with the Y-sensing electrode Y-S.E and the X-sensing electrode X-S.E are referred to as a first main pixel and a second main pixel respectively, the first main pixel and the second main pixel are disposed uniformly and alternately in the display panel 100. As the size of the main pixel is considerably smaller compared to the external stimulus, the sensing electrodes S.E may sufficiently react to the external stimulus although not being formed in the same main pixel. The sensing electrode S.E may be provided in each main pixel or the sensing electrode S.E may be formed at a predetermined interval.

The sensing driver 230 receives X position information pertaining to a stimulus through the second main pixel and Y position information pertaining thereto through the first main pixel, and controls the image applied to the display panel 100 using the received position information. The sensing driver 230 may include an analog-digital converter (not shown) which processes electric signals transmitted from the sensing line S.L.

The gate driver 210, also referred to as a scan driver, is connected to the gate line G.L to apply a gate signal which consists of a combination of a gate-on voltage Von and a gate-off voltage Voff.

The data driver 220 is also referred to as a source driver. The data driver 220 is supplied with a gray scale voltage from gray scale voltages generating part (not shown), selects a gray scale voltage according to external control, and applies a data voltage to the data line D.L.

Figure 3:
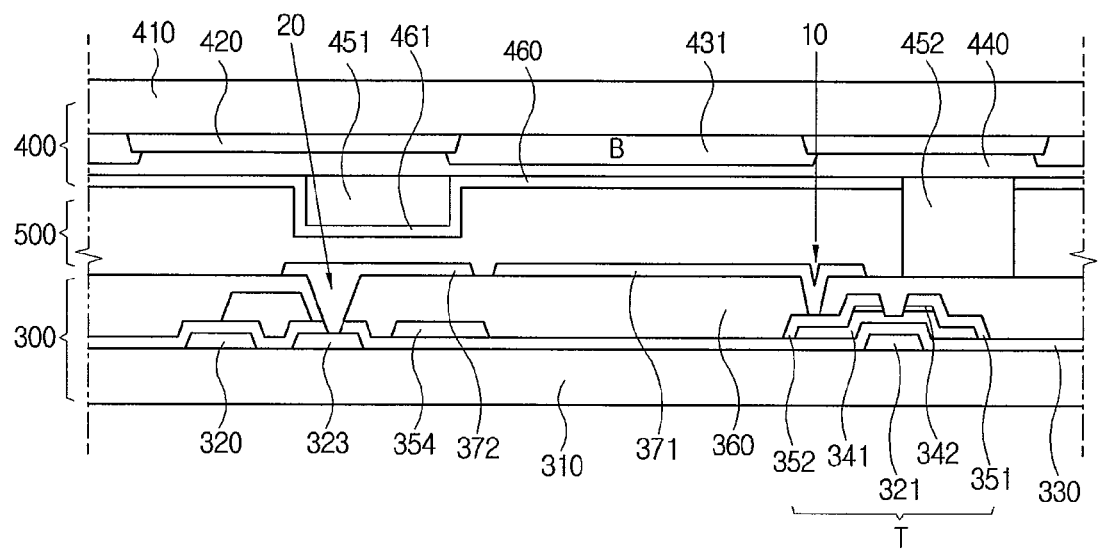
FIG. 3 is a cross-sectional view taken along line III-III in FIG. 2.
Figure 4:
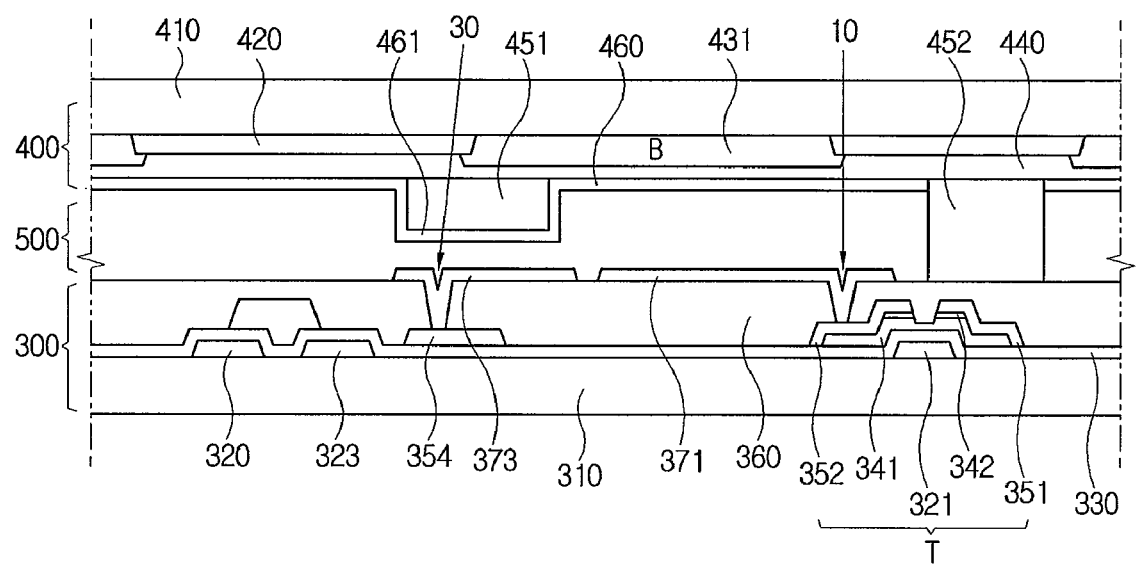
FIG. 4 is a cross-sectional view taken along line IV-IV in FIG. 2.

Referring to FIGS. 2 to 4, the sensing electrode according to the present exemplary embodiment will be described in detail. The display device according to the present exemplary embodiment includes a first substrate 300 where the main pixels I and II are formed, a second substrate 400 to face the first substrate 300 and a liquid crystal layer 500 disposed between the substrates 300 and 400.

The main pixels I and II are arranged in a matrix form on the first substrate 300. Each main pixel I and II includes the red sub-pixel R, the green sub-pixel G, the blue sub-pixel B and one sensing electrode 372 and 373. The sub-pixels R, G and B are generally rectangular-shaped. The main pixels I and II include the first main pixel I which includes the Y-sensing electrode 372 and the second main pixel II which includes the X-sensing electrode 373. The first main pixel I and the second main pixel II are disposed adjacent to each other. That is, the first main pixel I and the second main pixel II are disposed alternately, and one first main pixel I is surrounded by the second main pixels II.

In the present exemplary embodiment, as the sensing electrodes 372 and 373 are formed in the blue sub-pixel B, the blue sub-pixel B has a smaller area than the red sub-pixel R and the green sub-pixel G. Each of the sub-pixels R, G and B includes a TFT and a pixel electrode 371 electrically connected to the TFT.

Alternatively, the first main pixel I and the second main pixel II may be arranged alternately but spaced at a predetermined interval. Namely, a pixel which does not include the sensing electrode 372 and 373 is further provided between the first main pixel I and the second main pixel II.

In detail, gate wiring is formed on a first insulating substrate 310. The gate wiring may be a metal single layer or metal multi-layers. The gate wiring includes a gate line 320 extending transversely, a gate electrode 321 extending from the gate line 320 and a Y-sensing line 323 formed parallel with the gate line 320. The gate wiring may further include a storage electrode line which overlaps the pixel electrode 371 to form a storage capacity.

The gate line 320 and the Y-sensing line 323 are formed parallel with each other. Alternatively, the gate line 320 and the Y-sensing line 323 may be formed in zigzags or not parallel with each other.

The Y-sensing line 323 functions as a passage for analog signals such as an electric current or a voltage from the Y-sensing electrode 372 and provides position information about a pressurized place to the sensing driver 230 when an upper part of the Y-sensing electrode 372 is pressurized.

A gate insulating layer 330 made of silicon nitride (SiNx) or the like is formed on the first insulating substrate 310 and covers the gate wiring 320, 321 and 323.

A semiconductor layer 341 is made of amorphous silicon or the like and formed on the gate insulating layer 330 over the gate electrode 321. An ohmic contact layer 342 is made of n+ hydrogenated amorphous silicon which is highly doped with silicide or n-type impurities and formed on the semiconductor layer 341.

Data wiring is formed on the ohmic contact layer 342 and the gate insulating layer 330. The data wiring may be a single layer or multi-layer metal. The data wiring includes a data line 350 formed lengthwise to intersect the gate line 320 to form a pixel. An X-sensing line 353 is formed parallel with a source electrode 351. A drain electrode 352 and data line 350 intersects the Y-sensing line 323, and an extending part 354 formed where the Y-sensing electrode 372 and the X-sensing electrode 373 are to be provided.

The source electrode 351 is branched from the data line 350, and the drain electrode 352 is connected to the pixel electrode 371 through a contact hole 10.

The X-sensing line 353 functions as a passage where electric signals generated in the X-sensing electrode 373 are transmitted and provides position information about a pressurized place to the sensing driver 230 when the X-sensing electrode 373 is pressurized.

The extending part 354 extends from the X-sensing line 353 and is disposed under the sensing electrodes 372 and 373. The extending part 354 disposed below the Y-sensing electrode 372 maintains an interval between the Y-sensing electrode 372 and a contact electrode 461 of the second substrate 400 and an interval between the X-sensing electrode 373 and the contact electrode 461 equally (see FIG. 3). If the interval between the Y-sensing electrode 372 and the contact electrode 461 of the second substrate 400 and the interval between the X-sensing electrode 373 and the contact electrode 461 are maintained uniformly, the sensing electrodes 372 and 373 have the same height. Thus, the sensing electrodes 372 and 373 are improved in reactivity to a pressure when being pressurized with a predetermined pressure at the same time. A sensing spacer 451 is provided on the Y sensing electrode 372 where the extending part 354 is formed.

As the Y-sensing electrode 372 is connected to the Y-sensing line 323 through a contact hole 20, the extending part 354 formed below the Y-sensing electrode 372 may be omitted.

Referring to FIG. 4, the extending part 354 disposed below the X-sensing electrode 373 is in contact with the X-sensing electrode 373 through a contact hole 30 and transmits an electric signal generated in the X-sensing electrode 373 to the X-sensing line 353.

The extending part 354 is formed in a pixel region where the blue sub-pixel B is disposed, and thus the blue sub-pixel B has relatively small an aperture area as compared with the red and the green sub-pixels R and G. Blue is lower than red or green in visible sensitivity. Thus, when an aperture ratio of the blue sub-pixel B is lower than those of the other sub-pixels R and G, a user does not recognize that the blue sub-pixel B is insufficient. Thus, if one of sub-pixels R, G and B is reduced in aperture ratio as the sensing electrodes 372 and 373 are formed, the sensing electrodes 372 and 373 are formed in a pixel region where the blue sub-pixel B is formed to maintain aperture ratios of the other pixels R and G.

A passivation layer 360 is formed on the data wiring and a portion of the semiconductor layer 341 which is not covered therewith. The contact holes 10, 20 and 30 are formed in the passivation layer 360 to expose the drain electrode 352, the Y-sensing line 323 and the extending part 354, respectively.

The pixel electrode 371, the Y-sensing electrode 372 and the X-sensing electrode 373 are formed on the passivation layer 360. The pixel electrode 371 is made of a transparent conductive material such as indium tin oxide (ITO) or indium zinc oxide (IZO). The sensing electrodes 372 and 373 are formed of a transparent conductive material in the same layer as the pixel electrode 371. The blue sub-pixel B has a smaller area than the other sub-pixels R and G due to the sensing electrodes 372 and 373.

When a stimulus is given from the outside, the contact electrode 461 becomes in contact with the Y-sensing electrode 372 and the X-sensing electrode 373. The Y-sensing electrode 372 and the X-sensing electrode 373 may have an enough area to be easily in contact with the contact electrode 461. Areas of the Y-sensing electrode 372 and the X-sensing electrode 373 are at least equal to or larger than that of the contact electrode 461. Further, the areas of the Y-sensing electrode 372 and the X-sensing electrode 373 may be large in such a range as they do not influence the aperture ratios.

The Y-sensing electrode 372 and the X-sensing electrode 373 may have different areas or the same area. An area ratio of the Y-sensing electrode 372 and the X-sensing electrode 372 may be variable depending on the areas of the contact electrode 461 and the pixel electrode 371.

Next, the second substrate 400 will be described in the following.

A black matrix 420 is formed on a second insulating substrate 410. The black matrix 420 is disposed between a red, green and blue filters to divide the filters, and prevents light from being irradiated directly to the TFT T disposed on the first substrate 300. The black matrix 420 is typically made of a photoresist organic material including a black pigment. The black pigment may be carbon black, titanium oxide or the like. Further, the black matrix 420 may include a metal material such as chrome oxide.

A color filter layer 431 is formed on the second insulating substrate 410 where the pixel electrode 371 is disposed. The color filter layer 431 includes a red, a green and a blue filters which are alternately disposed and separated by the black matrix 420. The color filter layer 431 endows colors to light irradiated from the backlight unit (not shown) and passing through the liquid crystal layer 500. The color filter layer 431 is generally made of a photoresist organic material. The color filter layer 431 may be formed on the first substrate 300 or be omitted depending on a driving method of the backlight unit.

An overcoat layer 440 is formed on the color filter 431 and the black matrix 420 which does not cover the color filter 431. The overcoat layer 440 provides a flat surface and protects the color filter layer 431. The overcoat layer 440 is made of an acrylic epoxy material.

The sensing spacer 451 and a cell gap spacer 452 are formed on the overcoat layer 440 to transmit a sensing stimulus and to form a cell gap, respectively. The sensing spacer 451 is formed over the sensing electrodes 372 and 373, and the cell gap spacer 452 is formed over the TFT T. The cell gap spacer 452 is provided to keep the first substrate 300 spaced from the second substrate 400 at a regular distance. The liquid crystals are injected to a space formed by the substrates 300 and 400. When the user gives a stimulus to an upper part of the second substrate 400, the sensing spacer 451 transmits the stimulus to the first substrate 300.

A common electrode 460 is formed on the overcoat layer 440, and the contact electrode 461 is formed on the sensing spacer 451. The common electrode 460 and the contact electrode 461 are formed in the same layer and supplied with a predetermined level of common voltage. The common electrode 460 is made of a transparent conductive material such as ITO or IZO. The common electrode 460 and the contact electrode 461 are formed in the same layer by one process where a conductive material is deposited across the second insulating substrate 410 and the conductive material of the upper part of the cell gap spacer 452 is removed. The common electrode 451 applies a voltage directly to the liquid crystal layer 500 along with the pixel electrode 371 of the first substrate 300.

When a stimulus is given to the sensing electrodes 372 and 373 from the outside, the contact electrode 461 supplied with a common voltage comes in contact with the sensing electrodes 372 and 373 and the common voltage is applied to the sensing driver 230 through the sensing electrodes 372 and 373 and the sensing lines 323 and 353. The sensing driver 230 detects which of the main pixels I and II transmits the electric signal to determine the position that has been given the stimulus from the outside. The contact electrode 461 may be provided in a center area of the Y-sensing electrode 372 and the X-sensing electrode 373 in order to easily contact with the Y-sensing electrode 372 or the X-sensing electrode 373.

Alternatively, the sensing spacer 451 and the cell gap spacer 452 may be provided on the common electrode 460. Namely, the common electrode 460 and the contact electrode 461 may be formed by separate processes in different layers.

The liquid crystal layer 500 which includes liquid crystal molecules is disposed between the first substrate 300 and the second substrate 400.

Figure 5:
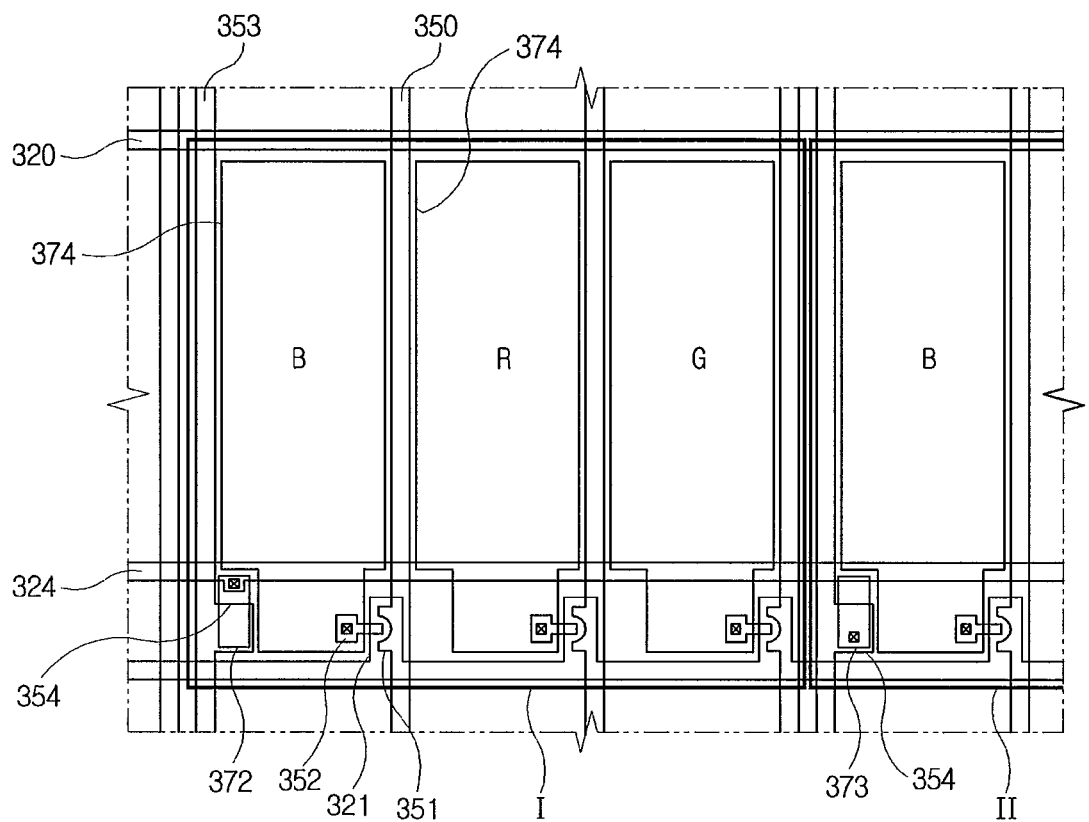
FIG. 5 is a plan view of a display device according to a second exemplary embodiment of the present invention.

FIG. 5 is a plan view of a display device according to a second exemplary embodiment of the present invention.

Each of sub-pixels R, G and B according to the present embodiment includes a pixel electrode 374 with substantially the same area. A Y-sensing line 323 is spaced from a gate line 320 and traverses a pixel region where the sub-pixels R, G, and B are formed. A drain electrode 352 of a TFT and an extending part 354 are formed under the Y-sensing line 323.

In the present embodiment, as the pixel electrodes 374 of a red sub-pixel R and a green sub-pixel G where the extending part 354 is not formed has the same shape as that of a blue sub-pixel B, an aperture ratio and transmittance are uniform in the sub-pixels R, G and B. Accordingly, a kickback voltage difference which may be generated by different sizes of the pixel electrodes 374 of the sub-pixels R, G and B can be reduced and an electric property among the sub-pixel electrodes R, G and B becomes uniform.

The sub-pixel electrodes R, G and B have the pixel electrodes 374 with the same size, and thus the extending part 354 may be provided in one of regions of the sub-pixels R, G and B.

According to the present invention, as one sensing electrode is formed in each main pixel, the aperture ratio is improved and a specific pixel electrode is prevented from decreasing in area as compared with a conventional two- or three-point contact type. Further, the position information about the external stimulus is easily transmitted by the one-point contact type, and thus the location where the stimulus is generated may be determined more accurately.

As described above, the present invention provides a display device where the aperture ratio is increased and visibility is improved.

Further, the present invention provides a display device which obtains position information easily and accurately.

Although a few exemplary embodiments of the present invention have been shown and described, it will be appreciated by those skilled in the art that changes may be made in these exemplary embodiments without departing from the principles and spirit of the invention, the scope of which is defined in the appended claims and their equivalents.

What is claimed is:

1. A display device comprising:
   a first insulating substrate;
   a main pixel formed on the first insulating substrate having a plurality of sub-pixels and a single sensing electrode;
   a second insulating substrate facing the first insulating substrate;
   a sensing spacer formed on the second insulating substrate which faces the sensing electrode; and
   a contact electrode formed on the sensing spacer.

2. The display device according to claim 1, wherein each sub-pixel comprises:
   a gate line;
   a data line which intersects the gate line;
   a thin film transistor connected to the gate line and the data line; and
   a pixel electrode electrically connected to the thin film transistor,
   wherein the main pixel comprises a red sub-pixel, a green sub-pixel and a blue sub-pixel.

3. The display device according to claim 2, further comprising:
- a first sensing line formed parallel with the gate line;
- a second sensing line formed parallel with the data line; and
- an extending part which extends from the second sensing line and overlaps with the sensing electrode.

4. The display device according to claim 3, wherein the main pixel comprises:
- a first main pixel which comprises a Y-sensing electrode connected to the first sensing line; and
- a second main pixel which comprises an X-sensing electrode connected to the second sensing line,
- wherein the first main pixel and the second main pixel are disposed alternately.

5. The display device according to claim 2, wherein the pixel electrode in each sub-pixel has substantially the same area.

6. The display device according to claim 2, wherein the pixel electrode of the one sub-pixel having the sensing electrode is smaller in area than the area of the other sub-pixels.

7. The display device according to claim 6, wherein a pixel electrode of the blue sub-pixel having the sensing electrode is smaller in area than the area of the other sub-pixels.

8. The display device according to claim 1, wherein the sensing electrode is formed in the same layer as the pixel electrode.

9. The display device according to claim 1, further comprising a common electrode formed on the second insulating substrate, wherein the common electrode and the contact electrode are supplied with a common voltage of a predetermined level.

10. The display device according to claim 9, wherein the contact electrode is formed in the same layer as the common electrode.

11. The display device according to claim 9, wherein the contact electrode is formed in a different layer from the common electrode.

12. The display device according to claim 1, further comprising a cell gap spacer formed on the second insulating substrate.

* * * * *